(12) United States Patent
van Rensburg et al.

(10) Patent No.: US 9,401,993 B1
(45) Date of Patent: Jul. 26, 2016

(54) AUTOMATIC LANGUAGE SELECTION FOR INTERACTIVE VOICE RESPONSE SYSTEM

(71) Applicant: RingCentral, Inc., Belmont, CA (US)

(72) Inventors: Christopher van Rensburg, Foster City, CA (US); Vlad Vendrow, Redwood City, CA (US)

(73) Assignee: RINGCENTRAL, INC., Belmont, CA (US)

( * ) Notice: Subject to any disclaimer, the term of this patent is extended or adjusted under 35 U.S.C. 154(b) by 0 days.

(21) Appl. No.: 14/732,636

(22) Filed: Jun. 5, 2015

(51) Int. Cl.
 H04M 1/64 (2006.01)
 H04M 3/51 (2006.01)
 H04M 3/527 (2006.01)
 H04M 3/523 (2006.01)
 H04M 3/42 (2006.01)

(52) U.S. Cl.
 CPC ........ *H04M 3/5233* (2013.01); *H04M 3/42059* (2013.01); *H04M 3/5166* (2013.01)

(58) Field of Classification Search
 None
 See application file for complete search history.

(56) References Cited

U.S. PATENT DOCUMENTS

| | | | |
|---|---|---|---|
| 7,088,814 B1* | 8/2006 | Shaffer | H04M 3/5233 379/265.01 |
| 2007/0165799 A1 | 7/2007 | Juncker | |
| 2008/0086681 A1* | 4/2008 | Sterns | H04M 3/51 715/236 |
| 2009/0006076 A1* | 1/2009 | Jindal | G06F 17/289 704/3 |
| 2014/0122053 A1* | 5/2014 | Lotan | H04M 3/493 704/2 |

OTHER PUBLICATIONS

Schelmetic, T.E., "IVR Solutions Provider Announces Multilingual Administration," Technology Marketing Corporation, Aug. 7, 2014, 2 pages [Online] [Retrieved on Feb. 20, 2015] Retrieved from the Internet<URL:http://technews.tmcnet.com/channels/ivr/articles/385951-ivr-solutions-provider-announces . . . >.

* cited by examiner

*Primary Examiner* — Harry S Hong
(74) *Attorney, Agent, or Firm* — Fenwick & West LLP

(57) ABSTRACT

An interactive voice response (IVR) system performs automatic language selection without requiring the caller to provide a manual language selection input. The IVR system receives an incoming call along with appropriate caller identification. The IVR system sends a request for the caller's language preference information either to the caller's device or to a service provider that hosts the caller's account. After receiving the caller's language preference information, the IVR system selects a language for the caller and provides an IVR menu tree using the selected language. The selected language is persisted as the caller's preferred language at either the IVR system or at a service provider for future use.

20 Claims, 4 Drawing Sheets

AUTOMATIC LANGUAGE SELECTION FOR INTERACTIVE VOICE RESPONSE SYSTEM

BACKGROUND

This disclosure generally relates to interactive voice response (IVR) systems, and specifically to an automatic language selection for IVR systems.

An IVR system includes one or more computers and telephony equipment that together automate the process of receiving incoming phone calls and interacting with human callers. Businesses commonly handle phone calls from customers using IVR systems because they reduce the burden on the businesses to hire human operators to handle routine transactions. During a call, an IVR system provides a menu of options to a caller and receives information from the caller, such as by using voice recognition or other forms of input such as input from the caller's phone keypad (e.g., DMTF tones) or from the caller's web browser (e.g., an embedded link to call an IVR system). The IVR system responds to a caller's inputs with either prerecorded or dynamically generated audio. The menu of options provided by an IVR system is often nested in a menu tree, which a caller may traverse to access the functionality of the IVR system. Multi-lingual IVR systems provide menu tree options in several languages to accommodate a caller's preferred language, if available. Conventionally, a caller selects a preferred language at or near the beginning of the call, after which the multi-lingual IVR system provides menu tree options for the caller using the preferred language. However, forcing a caller to select a preferred language every time (regardless of the caller's prior language selection) can be burdensome, especially if the caller uses the IVR system often.

Figure 1:
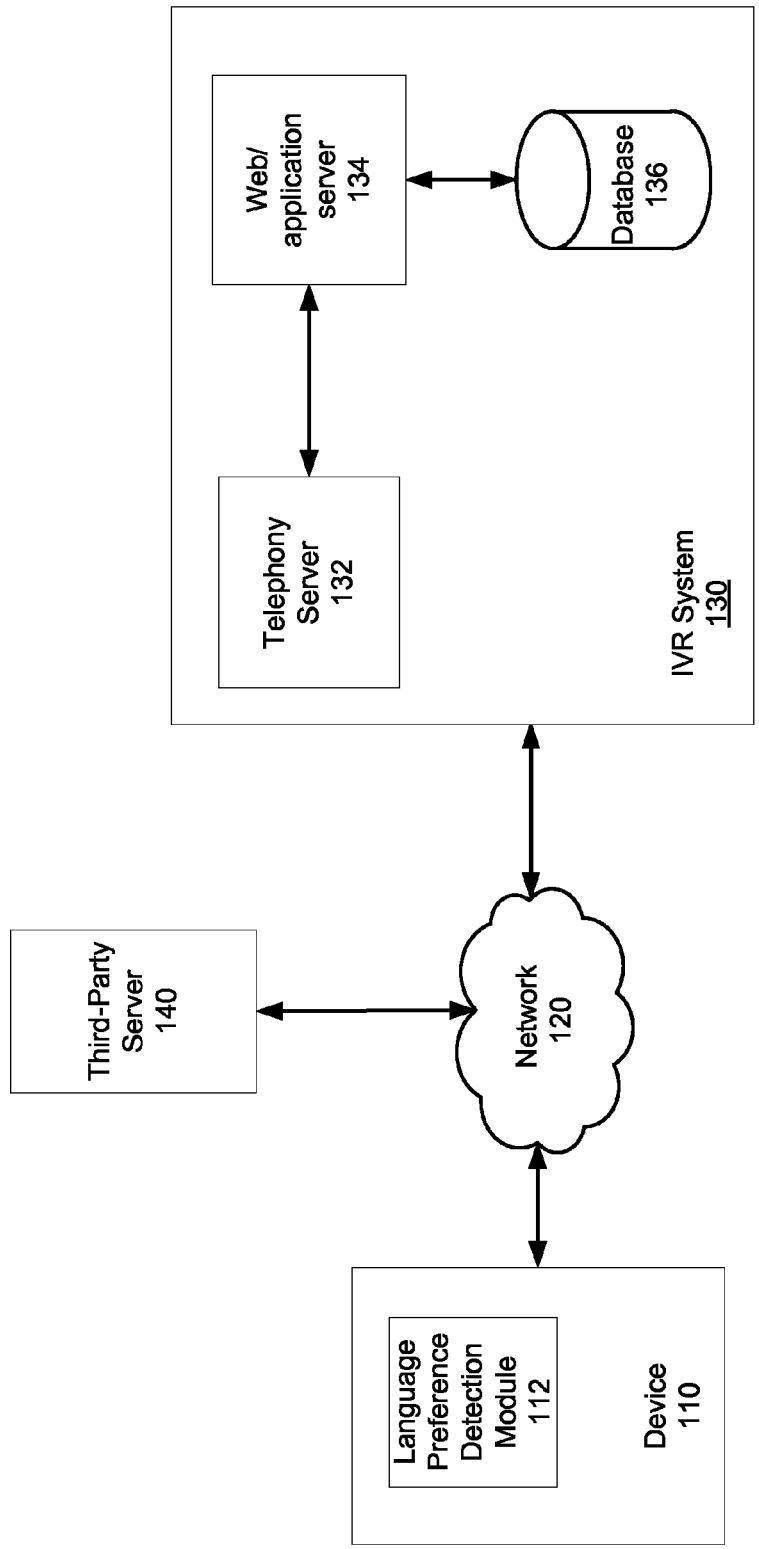
FIG. 1 is a block diagram of an IVR system interacting with a caller's device, according to an example embodiment of the present disclosure.

The figures depict various example embodiments of the present disclosure for purposes of illustration only. One skilled in the art will readily recognize from the following discussion that other example embodiments based on alternative structures and methods may be implemented without departing from the principles of the disclosure.

DETAILED DESCRIPTION

To facilitate interaction between an IVR system and one or more callers in their preferred language, an IVR system automatically selects a language for interacting with the IVR system based on each caller's stored language preference information. The caller's language preference information can include one or more preferred languages of the caller and any other preferences for how to select the one or more preferred languages (e.g., based on the user's location or the time of day). By automatically selecting a caller's preferred language, the caller need not provide a language selection input every time the caller accesses the IVR system. In addition, multiple IVR systems can share a particular caller's language preference information, such as by a common service provider or a third-party central language preference service. Sharing the caller's language preference information among multiple IVR systems allows an IVR system to present a caller with the caller's preferred language even where the caller has not previously accessed that IVR system.

In one example, an IVR system receives an incoming call and determines caller identification associated with the incoming call, such as the phone number used to initiate the call. The IVR system then uses the caller identification to determine the caller's preferred language. In one example, the IVR system queries a local data store maintained by the IVR system to determine a preferred language for the caller that had previously been used with the IVR system. The IVR system can also obtain the caller's preferred language from the caller's phone itself. In other examples, the IVR system accesses the caller's preferred language that had been used with a different IVR system, allowing the caller's preferred language to be used the first time the caller uses the IVR system. For example, where multiple IVR systems use the same telephony service provider, the telephony service provider exposes the caller's preferred language to each of the IVR systems administered by the service provider. In another example, IVR system requests the preferred language from a third-party server, which acts as a clearinghouse for sharing callers' language preferences among multiple IVR systems.

After determining the caller's preferred language, the IVR system selects a menu tree associated with the preferred language and uses the selected menu tree to interact with the caller using the caller's preferred language. If there is no previously stored or accessible preferred language for a caller, the IVR system can provide an option for the caller to specify a preferred language and then store that preferred language for future use of the IVR system.

FIG. 1 is a block diagram of an IVR system interacting with a caller's device, according to an example embodiment of the present disclosure. The system environment 100 shown in FIG. 1 includes a device 110, which can initiate a call to an IVR system 130. FIG. 1 also shows a network 120 that IVR system 130 uses to interact with the device 110. FIG. 1 further shows a third-party server 140 that interacts with the device 110 and IVR system 130 using network 120.

Network 120 allows the device 110 to interact with IVR system 130 and third-party server 140. In an example embodiment, network 120 uses standard communications technologies and/or protocols. Thus, network 120 can include links using technologies such as Ethernet, 802.11 standards, worldwide interoperability for microwave access (WiMAX), WiFi, 3G, digital subscriber line (DSL), etc. The data exchanged over network 120 can be represented using technologies and/or formats including the hypertext markup language (HTML), the extensible markup language (XML), etc. In an example embodiment, the network 120 includes a communications network such as the Internet.

IVR system 130 is coupled to the device 110 via network 120. The IVR system 130 receives a call from device 110 and responds to the call using one or more of its components. IVR system 130 includes a telephony server 132, an application server 134, and database 136.

The telephony server 132 receives the call from the device 110 over a telephone network such as a public switched telephone network (PSTN) or a voice over IP (VoIP) network. The telephony server 132 serves as an interpreter, or gateway, so that callers can interface with the IVR software and access information on databases within the IVR system 130. In an example embodiment, the telephony server 132 also contains software that controls functions like text-to-speech, voice recognition, and DTMF recognition. The telephony server 132 interfaces with the application server 134 to access software applications. In an example embodiment, the telephony server 132 and application server 134 are coupled within an organization's intranet. Alternatively, the telephony server 132 and application server 134 are coupled using a TCP/IP network such as Internet.

In an example embodiment, the telephony server 132 operates in a client-server architecture, where server 132 serves client devices such as device 110 based on any requests (e.g., phone calls) received from the client devices. In some example embodiments, telephony server 132 provides virtual private branch exchange (vPBX) services including telephony, fax, and electronic messages. In an example embodiment, telephony server 132 manages resources such as telephony resources.

The application server 134 is a server where the IVR software applications reside. Several different applications can reside on the same server such as an application for customer service, an application for outgoing sales calls, and an application for voice-to-text transcription. Software applications are generated using proprietary programming or scripting languages in traditional IVRs. In modern IVRs, however, standard extensible markup language (XML)-based languages such as VoiceXML, call control extensible markup language (CCXML), Speech Recognition Grammar Specification (SRGS), and Speech Synthesis Markup Language (SSML) are used. By using XML-based applications, a web server can be used as the application server 134 for modern IVRs.

The database 136 contains information that can be accessed by the IVR applications of application server 134. In an example embodiment, information associated with each IVR application resides in a different database 136. Alternatively, each database 136 contains information associated with two or more IVR applications. The database 136 is linked to the application server 134 over a TCP/IP network such as Internet.

The third-party server 140 is a server that hosts accounts for callers. For example, third-party server 140 is a server associated with service providers that provide telephony services for consumers and/or businesses. Some of the functions that third-party server 140 can perform include receiving, hosting, storing, and providing data associated with callers and their accounts including language preference information of the callers. For example, the third-party server 140 can be at least one of: an application server, communications server, database server, web server, proxy server, and a group of remote servers. In some embodiments, the third-party server 140 hosts a service provider that administers one or more IVR systems similar to servers 132 and 134. Alternatively, the third-party server 140 hosts a third-party entity that does not necessarily administer any IVR systems, but communicates with them to send and receive caller's preferences including language preference information. In an example embodiment, the third-party server 140 includes a language preference component (e.g., language preference component 240 of FIG. 2) that can host a language preference service for one or more IVR systems as described below with reference to FIG. 2. The third-party server 140 might not exist in example embodiments in which a single IVR system stores and persists a caller's language preference information.

The device 110 is an electronic device, such as cell phone, smart phone, desktop phone with or without a display, audio and/or video conferencing device, tablet, computer, gaming console, or any device that can make and/or receive phone calls with other devices. Device 110 includes, among other components, a memory module to store data and a language preference detection module 112 to detect a caller's language preference information.

The memory module of the device 110 stores data associated with identification of a caller using the device. For example, the memory module stores caller identification (caller id) such as a caller's telephone number that identifies either the caller making the call or the device from which the call originates. The caller id can also be referred to as calling line identification (CLID), calling number delivery (CND), calling number identification (CNID), or calling line identification presentation (CLIP). In an example embodiment, the memory module also stores additional information associated with the caller including one or more of: voiceprint identification, fingerprint identification, iris identification (i.e., eye-based), pin-based identification, and password-based verification. This additional information is useful to identify and/or authenticate a caller of the device when a single device is being shared by more than one caller.

In an example embodiment, the memory module also stores data associated with a language used while operating the device. For example, the memory module stores data associated with language selection for the device and/or a language used while the caller is providing a voice-based input or a text-based input while operating the device. The memory module can store language selection data for all applications located on the device.

The memory module can include high-speed random access memory and/or non-volatile memory, such as one or more magnetic disk storage devices, one or more optical storage devices, and/or flash memory (e.g., NAND, NOR). The memory module can store an operating system such as Darwin™, RTXC™, LINUX™, UNIX™, OS X™, WINDOWS™, ANDROID™, or an embedded operating system such as VxWorks™. The operating system can include instructions for handling basic system services and for performing hardware dependent tasks. In some implementations, the operating system can be a kernel (e.g., UNIX™ kernel). In an example embodiment, the memory module stores a version history of an operating system. The memory module can also store communication instructions to facilitate communicating with one or more additional devices, one or more computers and/or one or more servers (e.g., server 130).

The language preference detection module 112 detects language preference information associated with a caller of the device 110. In an example embodiment, the detected language preference information includes a language used while the caller operates the device 110. For example, the language used by the caller when the caller provides a text-based input (e.g., typing a text message or an email). Another example includes a language used while providing voice-based input during an operation of the device. Example voice-based input operations can include the caller speaking during a phone call or providing voice-based input to a natural language caller interface of a personal assistant such as Siri® or Cortana® on a smart phone.

In an example embodiment, the detected language preference information includes a language that is extracted from content surrounding a phone number linked on a web page or in an email message accessed by the caller. For example, an application provides content to the caller using a web browser or an email client in a preferred language that includes one or more phone numbers that may be linked to the content. When the caller initiates a call to an IVR system by invoking a linked phone number, the application determines a language used for the content surrounding the linked phone number and uses the determined language as the caller's preferred language. The application either knows the caller's preferred language apriori so that it does not have to determine preferred language or can determine the language used in the content by a number of methods. In an example embodiment, the application determines the caller's preferred language by analyzing the surrounding content after the caller initiates the call. Alternatively, the application determines the language of the surrounding content as soon as the caller begins accessing the content, and before the caller initiates the call. In an example embodiment, the application determines language of the content by analyzing header information, such as hypertext transfer protocol (HTTP) response headers or multi-purpose Internet mail extensions (MIME) headers.

In an example embodiment, the detected language preference information includes a preferred language for the caller that varies with a time of the day at which the call is placed. For example, a caller can have one preferred language during regular business hours and another preferred language during other hours of the day. In the example embodiment, the caller can have different preferred language for activities related to work and activities not related to work. Accordingly, different preferred languages can be included in the received language preference information based on a time of the day at which the IVR system receives 410 the incoming call.

After the application identifies the caller's language preference information, the application can then provide the language preference information as supplemental information to the phone dialer application when the caller invokes the linked phone number within the displayed content. The phone application then provides this supplemental information by transmitting it as the language preference information. In an example embodiment, the application can send the language preference information to a second application also included in the device. For example, the second application can be an application affiliated with the IVR system or the common service provider. The second application can interface with the IVR system or the common service provider to provide the caller's language preference information.

In an example embodiment, the detected language preference information includes a language that is extracted from the operating system of the device. For example, OS X® operating system is available in many different system languages such as, English, French, German, Korean, etc., and a caller selects one of those system languages at installation. By examining the language selected for the operating system installed on the device, a determination can be made for the caller's preferred language. For example, if Korean language is selected for the installed operating system, the received language preference information includes Korean as the preferred language. In an example embodiment, the detected language preference information includes a language that is extracted from an application on the device. Similar to the operating system, applications are available in different languages and by examining the language selection of the application installed on the device, a determination can be made for the caller's preferred language.

Figure 2:
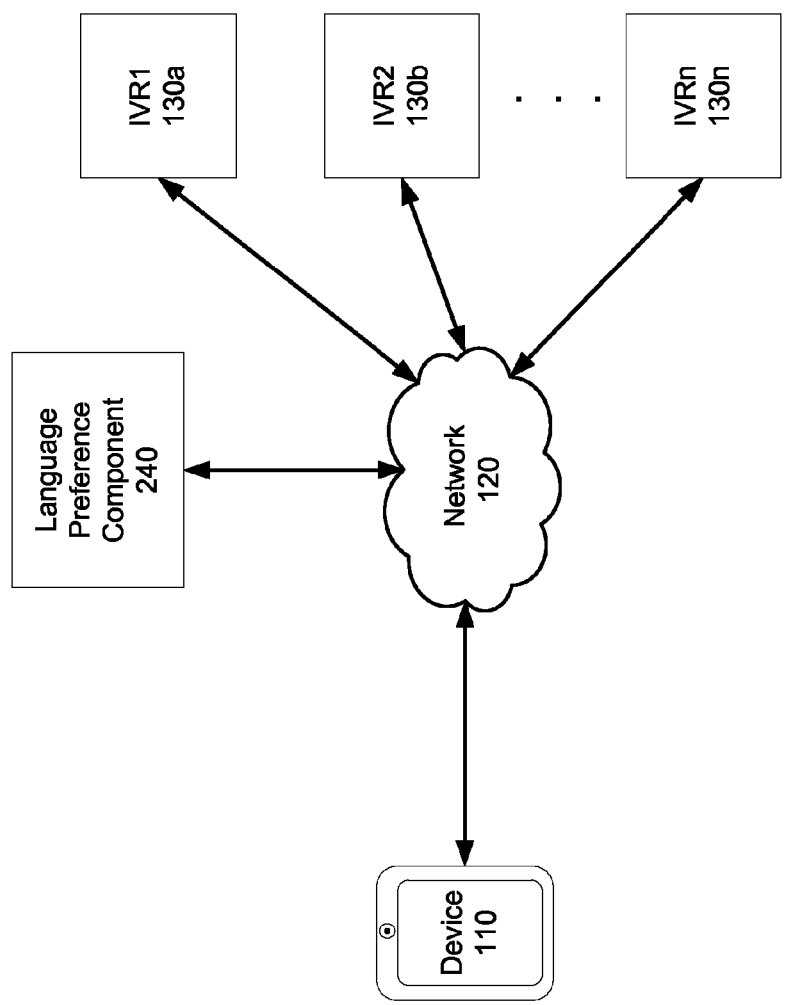
FIG. 2 is a block diagram illustrating multiple IVR systems including a language preference service, according to an example embodiment.

FIG. 2 is a block diagram illustrating IVR systems including a language preference service, according to an example embodiment. FIG. 2 shows a system environment including a plurality of IVR systems, IVR1 through IVRn, each of which is similar to the IVR system 130 of FIG. 1. The system environment 200 includes a device 110, which initiates a call to one of the IVR systems. FIG. 2 also includes a network 120 that IVR systems IVR1-*n* use to interact with the device 110. FIG. 2 further shows a language preference component 240 that is included in a third-party server (e.g., third-party server 140) that provides language preference service to the one or more IVR systems IVR1-*n*.

Each of the IVR systems IVR1-*n* can be the same as or functionally equivalent to the IVR system 130 described above with reference to FIG. 1. In an example embodiment, each IVR system IVR1-*n* is hosted by a separate set of servers (e.g., a set of telephony server 132 and application server 134). Alternatively, a set of servers host two or more IVR systems IVR1-*n*. The language preference component 240 provides language preference service to the one or more IVR systems, IVR1-*n*, for one or more callers calling in to the IVR systems. The language preference component 240 can include language preference information for the callers registered with its service. For example, the language preference component 240 (e.g., of third-party server 140 providing telephony services) includes language preference information for a plurality of callers of its telephone services. In an example embodiment, the language preference component 240 receives the callers' language preference information at a time when the callers register for its services. Alternatively, the language preference component 240 or some other component of the third-party server determines language preference information for callers based on various actions performed by the callers. For example, the third-party server can analyze the callers' telephone call history, text messaging history, multimedia messaging history, and the like to determine language preference information, and store such information within the server.

In an example embodiment, the language preference component 240 receives the caller's language preference information from an IVR system in connection with a call received at the IVR system. For example, when a caller places a call to an IVR system, the IVR system automatically determines the preferred language of the caller or receives the caller's preferred language from the caller's device (e.g., mobile phone) that placed the call, which can then be passed on to a language preference component hosted by a language preference service that has a relationship with the IVR system. Alternatively, the language preference component 240 can determine the caller's language preference information based on the context from which the incoming call was initiated to the IVR system. For example, a caller initiates a call to the IVR system by invoking a phone number link embedded within a web page or an email message being accessed by the caller. In such example scenario, the caller's device or the language preference component 240 (either through an application running on the caller's device or based on information received from the IVR system) can analyze the content surrounding the linked phone number to determine a language of the surrounding content, and pass the determined language as the caller's preferred language. In an example embodiment, a language parameter is added to the code that embeds the phone number link within the web page or email message such that the language preference component 240 can provide a language selection of the language parameter as the caller's preferred language without needing to analyze the surrounding content.

The language preference service can have a relationship with one or more IVR systems IVR1-*n* to share its callers' language preference information with the IVR systems IVR1-*n*, irrespective of whether the language preference service administers the one or more IVR systems or not. For example, IVR1 is an IVR system of a cable television service provider and IVR2 is an IVR system of a bank. If both the cable television service provider and the bank have a relationship with the language preference service of the language preference component 240 (e.g., service provided by a phone service provider) to share callers' information, when a caller that is registered with the phone service provider calls the cable television service provider and/or the bank, the caller's language preference information is retrieved from the same language preference service. In this way, the language preference service can be shared with multiple IVR systems.

In an example embodiment, the language preference component 240 providing the language preference service is hosted by the IVR system itself. In such embodiment, a caller's language preference information can be shared among different IVR menu trees offered by the IVR system's different enterprise customers for their respective end callers using their business phone numbers. For example, an enterprise cloud PBX service serving hundreds of thousands of enterprise business customers offering IVR menu trees can share a caller's language preference information across all IVR menu trees of their customers. In an example embodiment, the phone service provider offers the language preference service to other IVR systems hosting other telephony service providers.

In an example embodiment, the caller's language preference information includes only one preferred language. Alternatively, the caller's language preference information includes two or more preferred languages. For example, a caller might prefer a first language for work-related activities and a second language for personal activities. When the caller's language preference information includes two or more preferred languages, the system can select a preferred language for the received call based on a nature of relationship between the caller and the IVR system. For example, a caller may have two separate phone numbers, a business number and a personal number. When the caller calls an IVR system of an Internet service provider, the system identifies the caller id as either a business number or a personal number, and selects the appropriate preferred language that is associated with the business number or the personal number accordingly. Other example embodiments when the caller's language preference information comprises two or more preferred languages include a first language for a certain time period of the day when the caller is typically at work and a second language for another time period of the day when the caller is typically not at work. Another example embodiment when the caller's language preference information comprises two or more preferred languages include scenarios where a specific IVR menu tree does not support a caller's first preferred language but does support one of the other preferred languages.

A method of automatically selecting a caller's preferred language for an IVR system is described below with reference to FIG. 4. An exemplary IVR menu tree is described below with reference to FIG. 3.

Figure 3:
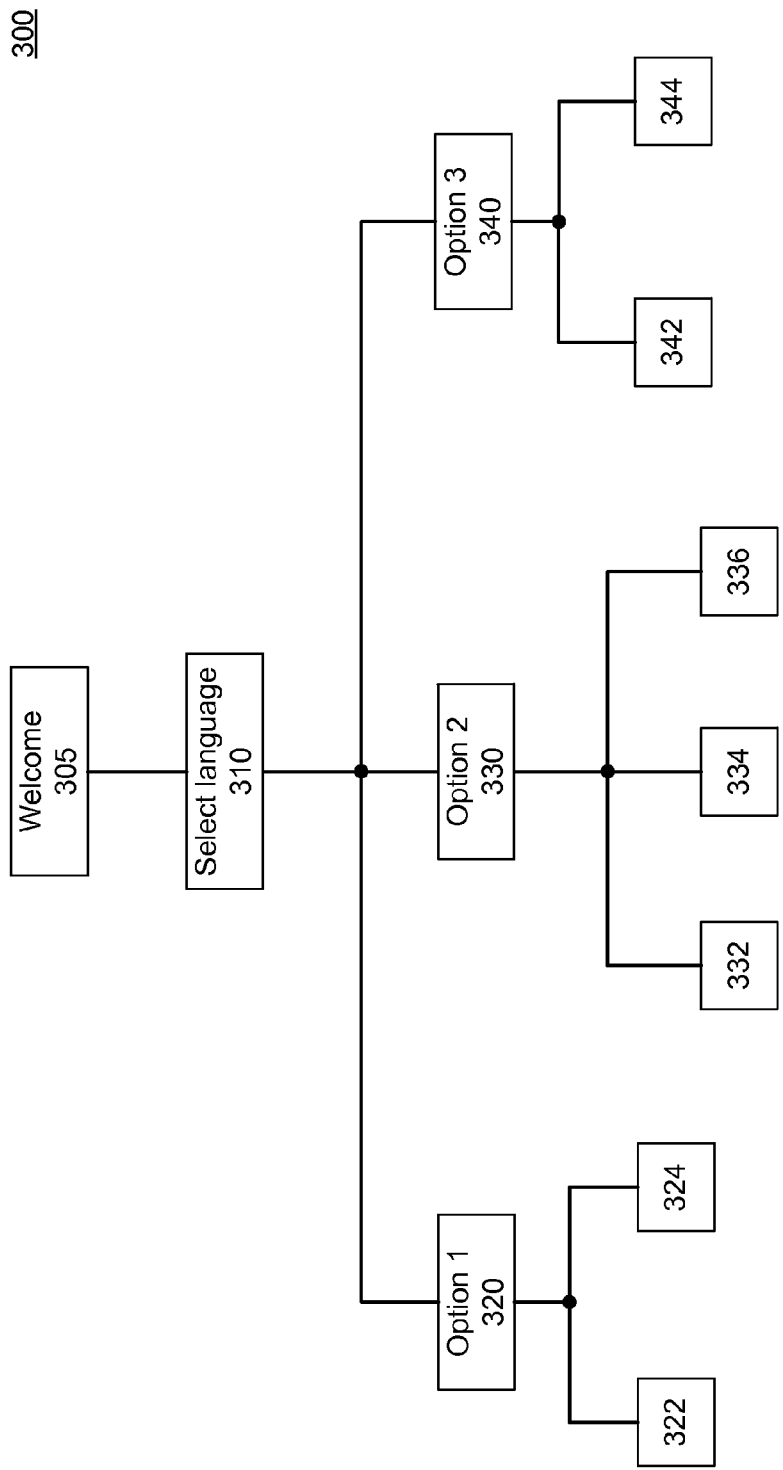
FIG. 3 is a block diagram illustrating a menu tree for an IVR system, according to an example embodiment.

FIG. 3 is a block diagram illustrating a menu tree 300 for an IVR system, according to an example embodiment. The menu tree 300 is an example menu tree for a typical IVR system. When an IVR system receives an incoming call from a caller, the IVR system presents an IVR menu tree that typically has a welcome message 305 for the caller. Next, the menu tree 300 provides a select language option 310 for the caller. Conventionally, the caller provides an input (e.g., text-based, voice-based, or input using a phone keypad or a web browser) for selecting a language for option 310. After receiving the caller's language selection or automatically determining a preferred language as described below with reference to FIG. 4, the IVR system provides the caller with the rest of the menu tree 300 in the selected language for further interaction. In an example embodiment, the IVR system can query for the caller's preferred language as soon as receiving the incoming call and before even presenting the welcome message 305. In such an example embodiment, the IVR system provides the menu tree 300 beginning with the welcome message 305 in the caller's preferred language.

In an example embodiment, the IVR system provides an option for the caller to select a preferred language (i.e., select language option 310) even though the IVR system automatically determines the caller's preferred language by default. This option would give the caller an opportunity to override the language automatically selected by the IVR system in case the caller changes his preference or when the caller does not agree with the system's automatically selected language choice.

After language selection, the IVR system provides option 1 320, option 2 330, and option 3 340 for the caller. Each of these options 320, 330, and 340, include additional options down the hierarchical menu tree. For example, in an IVR menu tree for a bank, option 1 330 can correspond to credit cards, option 2 330 can correspond to debit cards, and option 3 340 can correspond to checking account. After the caller makes an appropriate selection, the IVR system provides additional menu tree options for the selected option. For example, if the caller selects option 1 330 for credit cards, the IVR system then provides additional menu tree options 322 and 324 to the caller. Option 322 can correspond to checking balance on the credit card and option 324 can correspond to paying the balance. Depending on what the caller intends to do, the caller selects the appropriate option to perform the intended interaction. It is understood that other menu tree options such as options within the hierarchy of option 2 330 and option 2 340 can be selected by the caller similar to the menu tree options within the hierarchy of option 1 320 described above.

If the caller's language selection can be automated, as described herein, the select language option 310 can be bypassed. For example, after the caller hears a welcome greeting 305 (in either the default language or in the caller's preferred language as automatically determined by the IVR system), the caller is taken directly to the menu tree options option 1 320, option 2 330, and option 3 340 for selection using a language determined by the IVR system. The IVR system determines an appropriate preferred language for the caller by using a method described below with reference to FIG. 4. In an example embodiment, if the IVR system is unable to select a preferred language automatically for the caller, the IVR system then presents the menu tree option 310 for the caller to provide a preferred language. Once the IVR system receives a preferred language for the caller (either it determines automatically or receives a choice from the caller), the IVR system acts to persist the language preference information.

In an example embodiment, the language preference information is persisted (e.g., stored) within an IVR system component (e.g., telephony server 132 or database 136) at least for the duration of the caller's call session. Alternatively, the IVR system can provide the language preference information to the language preference component 240 for storing the language preference information. For example, the language preference information is stored at a server hosting the language preference service (e.g., third-party server 140) such that the language preference information can be shared across multiple call sessions, across multiple IVR systems, and/or potentially across multiple phone service providers. In an example embodiment, the language preference information is stored at both the IVR system and at the language preference service. For example, the language preference information is stored at a server hosting the IVR system (e.g., telephony server 132) and at the third-party server hosting the language preference service.

Figure 4:
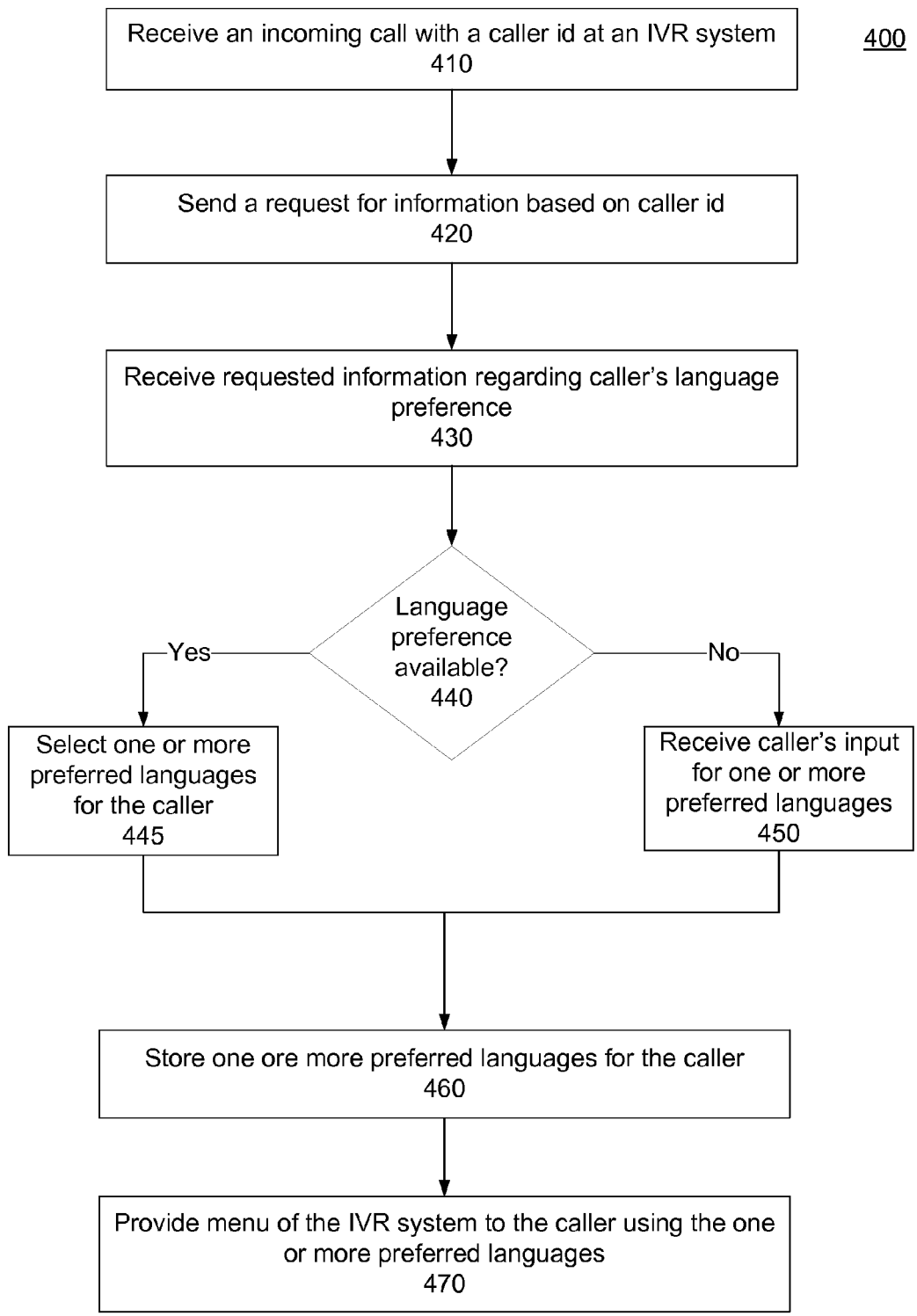
FIG. 4 is a flowchart illustrating a method for automatically selecting a preferred language for a caller at an IVR system, according to an example embodiment.

FIG. 4 is a flowchart illustrating a method for automatically selecting a preferred language for a caller at an IVR system, according to an example embodiment. FIG. 4 depicts various tasks involved in the automatically selecting of a preferred language for the caller. The various tasks of FIG. 4 can be implemented by a component of the IVR system (e.g., telephony server 132, application server 134, or database 136 of FIG. 1).

An IVR system receives 410 an incoming call from a caller's device (e.g., device 110) along with information to identify the caller making the call. In an example embodiment, the identification information is a caller id number that either identifies the caller's device from which the call originates or the caller making the call. For example, the caller id is a caller's telephone number. Other forms of caller identification can include one or more of: voiceprint identification, fingerprint identification, iris identification (i.e., eye-based), pin-based identification, and password-based verification. These other forms of caller identification are useful in example embodiments where a single device is being shared by more than one caller such that the caller of the device can be different every time the device is used for making a call to IVR systems.

After receiving the incoming call, the IVR system sends 420 a request for the caller's language preference information based on the received caller identification information. In response to the request for information, the IVR system receives 430 the requested caller's language preference information. This process of determining the caller's preferred language, in which the IVR system sends 420 this request and receives 430 the requested information, can be accomplished in a number of different ways.

In one embodiment, for example, the request is sent to the caller's device for the caller's language preference information. The request sent to the device can seek information of the caller's language preference, which is detected using the device's language preference detection module 112 as described above with reference to FIG. 1. The device's language preference detection module 112 detects the caller's language preference information while the caller operates the device. Example device operations can include reading content on the device, providing text-based input to the device, providing voice-based input to the device, performing an action on an operating system of the device, executing or updating an application on the device, and the like. Alternatively, the caller's device provides the caller's language preference information to the IVR system while initiating the incoming call. For example, the caller's device can transmit the caller's language preference information as supplemental information along with the initial request to the IVR system when initiating the call. In an example scenario when using voice over IP (VoIP) communications, the language preference information can be transmitted using a session initiation protocol (SIP).

In another embodiment, for example, the caller's language preference information is stored locally at the IVR system such that a database associated with the IVR system is queried for the caller's language preference information. The IVR system's local database might have stored the caller's language preference information when the caller previously interacted with the IVR system. In this embodiment, the request referred to in steps 420 and 430 is handled within the IVR system.

In another embodiment, the language preference information is stored such that the stored information can be used across multiple IVR systems. For example, in a case where multiple IVR systems are administered by a common telephony service provider, the common service provider exposes the caller's language preference to each of the IVR systems administered by the service provider. The common service provider is hosted by a third-party server 140 such that the language preference information is stored at the language preference component 240 within the third-party server. In this example, the language preference information stored at the common service provider is received from one of the IVR systems administered by the common service provider. Alternatively, the caller's language preference information is stored with the common service provider when the caller had registered with the common service provider before calling the IVR system as described above with reference to FIG. 2. In an example scenario, the IVR system receiving the call has access to the caller's language preference information through the common service provider allowing the caller's preferred language to be used the first time the caller uses the IVR system.

In another embodiment, the language preference information is stored at an external third-party language preference service provider (e.g., the language preference component 240 described with reference to FIG. 2) such that the stored information can be used across multiple IVR systems even though the third-party language preference service provider does not administer any IVR systems. The third-party language preference service provider is hosted by a third-party server such as third-party server 140. The third-party language preference service provider has a relationship with multiple IVR systems and acts as a clearinghouse for sharing callers' language preferences among multiple IVR systems. The third-party language preference service provider can receive the caller's language preference information from the IVR system that receives the call or a different IVR system of the multiple IVR systems that have a relationship with it. An example technique for communication between the third-party server and the servers hosting the one or more IVR systems relate to using application programming interface (API)-based routines to retrieve the caller's language preference information. Another example technique involves handing off the received call (e.g., call forwarding) from a first IVR system that does not have the caller's language preference information to a second IVR system that has the caller's language preference information persisted in its local database, and the second IVR system transfers back the call to the first IVR system after retrieving the caller's language preference information.

Upon receiving 430 the caller's language preference information, the IVR system checks 440 whether one or more preferred languages are available within the received language preference information. If so, the IVR system selects 445 the one or more preferred languages for the caller. If not, the IVR system requests the caller to provide a preferred language, and receives 450 the caller's input. After selecting 445 or receiving 450 a preferred language for the caller, the IVR system makes the preferred language persistent for the caller for any future use by storing 460 the preferred language. In an example embodiment, the preferred language is stored 460 as the caller's language preference information for any future calls from the caller at either the IVR system or across multiple IVR systems. For example, the preferred language is stored as the caller's language preference information within the IVR system's local database (e.g., database 136) or communicated to a third-party such as the service provider or the third-party server. The preferred language is stored at the local database when the preferred language of the caller is received from the caller herself or when the IVR system receives the language preference information from an entity external to the IVR system (e.g., other IVR systems, an external third-party language preference service provider, or common service provider).

The IVR system provides 470 an IVR menu tree of options to the caller using the preferred language. In an example embodiment, the IVR system provides an IVR menu tree with an option to transfer the caller's call to a customer service agent fluent in the preferred language. In an example embodiment, the IVR system provides at least a portion of the IVR menu tree using a machine-translated text and/or text-to-speech audio. For a given language, an IVR menu tree is provided with either professionally recorded audio for the entire menu tree or some combination of professionally recorded audio, machine translated text, and text-to-speech audio for a portion of the menu tree. In an example embodiment, an IVR menu tree can comprise menu tree options with audio recordings and associated text transcripts. In the case where audio recordings have not been supplied for a menu tree option and the menu tree option is only available as a text transcript, text-to-speech can be employed to generate audio in the language of the text transcript.

In an example embodiment, where a translation of the text transcript for a menu tree option is provided but no audio recording has been supplied in the caller's preferred language, the audio recording can be generated using text-to-speech using a voice in the language of the translated text transcript. In the case where there is neither an audio recording nor a translated text transcript in the caller's preferred language, machine translation can first be used to translate the text from the source or primary language to the language of the menu tree (i.e., the caller's preferred language), and audio can be produced from the machine translated text using text-to-speech. The technique of using machine translation and/or text-to-speech can be employed to complete a menu tree at different levels of completeness, ranging from completely absent of any translated text and associated audio, to being sparsely populated with varying amounts of human translated text and human recorded audio. An example advantage of storing callers' language preference information is an ability to predict caller demand for the IVR menu tree in different languages. The predicted demand can be used in making a determination whether or not to have a professional grade audio recording for the IVR menu tree in a language that presently does not have such professional grade audio recording.

In an example embodiment, when the IVR system selects (or receives) two preferred languages, the IVR system provides a first portion of the IVR menu tree in a first preferred language and a second portion of the IVR menu tree in a second preferred language. In an example scenario, a complete IVR menu tree is available in the caller's second preferred language but only a partial menu tree is available in the caller's first preferred language. One way to present the entire menu tree in the caller's first preferred language is to perform a combination of machine translation of text and/or text-to-speech conversion. If the caller preferences indicate that the caller actually prefers the menu tree as a professionally recorded audio in the second preferred language as opposed to machine translated (and/or text-to-speech converted) menu tree in the first preferred language, the system can present the partial menu tree available in the caller's first preferred language and the remaining menu tree in the caller's second preferred language.

Each of the above identified instructions and applications can correspond to a set of instructions for performing one or more functions described above. These instructions need not be implemented as separate software programs, procedures, or modules. The memory module of the device 110 can include additional instructions or fewer instructions. It is understood that a module can be implemented in hardware, or software, or a combination of hardware and software. Furthermore, various functions of the mobile device can be implemented in hardware and/or in software, including in one or more signal processing and/or application specific integrated circuits.

The disclosure of the example embodiments is intended to be illustrative, but not limiting. Persons skilled in the relevant art can appreciate that many modifications and variations to the foregoing example embodiments are possible in light of the above disclosure.

What is claimed is:

1. A computer-implemented method comprising:
   receiving an incoming call at an interactive voice response (IVR) system, the incoming call comprising a caller id of a device associated with a caller placing the incoming call;
   sending a request for the caller's language preference based on the caller id to a server, the server configured to store the caller's language preference used for a different IVR system;
   upon receiving the caller's language preference from the server, selecting a language for the caller based on the caller's language preference; and
   providing a menu tree of the IVR system to the caller using the selected language.

2. The computer-implemented method of claim 1, further comprising:
   storing the selected language as the caller's language preference for future calls at the IVR system.

3. The computer-implemented method of claim 2, wherein the caller's language preference is stored at the IVR system.

4. The computer-implemented method of claim 2, wherein the caller's language preference is stored at a language preference service hosted by a third-party.

5. The computer-implemented method of claim 1, wherein the incoming call further comprises information for at least one of: voiceprint identification, fingerprint identification, iris identification, pin-based identification, and password-based verification.

6. The computer-implemented method of claim 1, wherein sending the request for the caller's language preference comprises information from at least one of: a language used while operating the device and a language stored with a caller's account at a common service provider.

7. The computer-implemented method of claim 6, wherein the language used while operating the device comprises at least one of: a language used while reading content, a language used for providing text-based input, and a language used while providing voice-based input while operating the device.

8. The computer-implemented method of claim 6, wherein the language used while operating the device comprises a language extracted from an application running on the caller's device.

9. The computer-implemented method of claim 8, wherein the application running on the caller's device is associated with either the IVR system or a common service provider that has a relationship with the IVR system.

10. The computer-implemented method of claim 8, wherein the application receives the caller's language preference information when other applications are executed on the device.

11. The computer-implemented method of claim 6, wherein the language used while operating the device is selected at a time prior to a time at which the IVR system receives the incoming call.

12. The computer-implemented method of claim 1, wherein selecting the language for the caller is based on at least one of: a time of receiving the incoming call, a language selection of an operating system of the device, and a language selection of an application on the device.

13. The computer-implemented method of claim 1, wherein the incoming call is initiated in response to invoking a phone number link embedded within a web page or an email message.

14. The computer-implemented method of claim 13, wherein sending the request for the caller's language preference comprises information of a language used for content surrounding the phone number link embedded within the web page or the email message.

15. The computer-implemented method of claim 1, wherein the received caller's language preference comprises more than one language.

16. The computer-implemented method of claim 15, wherein providing the IVR menu tree comprises providing a first portion of the IVR menu tree in a first language and providing a second portion of the IVR menu tree in a second language.

17. The computer-implemented method of claim 1, wherein providing the IVR menu tree comprises providing a portion of the IVR menu tree using a machine-translated audio in the selected language.

18. The computer-implemented method of claim 1, wherein providing the IVR menu tree comprises providing an option to transfer the call to a customer service agent fluent in the selected language.

19. The computer-implemented method of claim 1, wherein the caller's language preference is received while receiving the incoming call.

20. A non-transitory computer-readable storage medium, the storage medium storing computer program instructions, executed by a computer processor, the computer program instructions comprising instructions for:
    receiving an incoming call at an interactive voice response (IVR) system, the incoming call comprising a caller id of a device associated with a caller placing the incoming call;
    sending a request for the caller's language preference based on the caller id to a server, the server configured to store the caller's language preference used for a different IVR system;
    upon receiving the caller's language preference from the server, selecting a language for the caller based on the caller's language preference; and
    providing a menu tree of the IVR system to the caller using the selected language.

\* \* \* \* \*